(12) United States Patent
Obermeyer et al.

(10) Patent No.: US 8,470,404 B2
(45) Date of Patent: Jun. 25, 2013

(54) PROCESS OF MANUFACTURING FIBER REINFORCED COMPOSITE VIA SELECTIVE INFUSION OF RESIN AND RESIN BLOCKING SUBSTANCE

(75) Inventors: Henry K. Obermeyer, Wellington, CO (US); Eric N. Gilbert, St. Louis, MO (US); Grant Quinn Baker, Fort Collins, CO (US)

(73) Assignee: Henry K. Obermeyer, Wellington, CO (US)

( * ) Notice: Subject to any disclaimer, the term of this patent is extended or adjusted under 35 U.S.C. 154(b) by 1105 days.

(21) Appl. No.: 11/792,903

(22) PCT Filed: Aug. 31, 2005

(86) PCT No.: PCT/US2005/031243
§ 371 (c)(1),
(2), (4) Date: Jun. 8, 2007

(87) PCT Pub. No.: WO2006/026734
PCT Pub. Date: Mar. 9, 2006

(65) Prior Publication Data
US 2009/0068365 A1    Mar. 12, 2009

Related U.S. Application Data

(60) Provisional application No. 60/606,231, filed on Aug. 31, 2004.

(51) Int. Cl.
| | |
|---|---|
| *B05D 1/32* | (2006.01) |
| *C08F 2/46* | (2006.01) |
| *B32B 9/04* | (2006.01) |
| *B29C 65/00* | (2006.01) |

(52) U.S. Cl.
CPC .................................. *B05D 1/32* (2013.01)
USPC .......................... 427/282; 427/271; 427/272

(58) Field of Classification Search
CPC ....................................................... B05D 1/32
USPC .......................................... 427/271, 272, 282
See application file for complete search history.

(56) References Cited

U.S. PATENT DOCUMENTS 3,185,605 A * 5/1965 Osborne et al. ............... 156/289
4,745,008 A    5/1988 Plotzker et al.
(Continued)

FOREIGN PATENT DOCUMENTS
| EP | 0341993 | 11/1989 |
|---|---|---|
| EP | 0970800 | 12/2000 |

(Continued)

OTHER PUBLICATIONS

Koyler, J.M. et al Intl. SAMPE Tech. Conf. Series 45, 365 (2000).
(Continued)

*Primary Examiner* — William Phillip Fletcher, III
(74) *Attorney, Agent, or Firm* — Santangelo Law Offices, P.C.

(57) ABSTRACT

The invention relates to joined fiber reinforced composite structures with continuity of fiber reinforcement across adhesive-to-substrate boundaries. Use of a thermal gradient to control the extent of infusion of resin blocking substances into fiber reinforced material, and subsequent resin infusion and resin blocking substance removal, during manufacture of components to be subsequently bonded, provides partially exposed reinforcing fibers which serve to reinforce a subsequently formed joint or boundary.

39 Claims, 12 Drawing Sheets

U.S. PATENT DOCUMENTS

| | | | |
|---|---|---|---|
| 4,856,136 A | 8/1989 | Janssen | |
| 4,869,954 A | 9/1989 | Squitieri | |
| 4,888,228 A | 12/1989 | Sidles | |
| 4,931,125 A | 6/1990 | Volkmann et al. | |
| 4,946,736 A | 8/1990 | Sassa | |
| 4,955,970 A | 9/1990 | Kivi et al. | |
| 4,957,805 A | 9/1990 | Biggs et al. | |
| 4,968,383 A | 11/1990 | Volkmann et al. | |
| 5,014,161 A | 5/1991 | Lee et al. | |
| 5,077,637 A | 12/1991 | Martorana et al. | |
| 5,095,628 A | 3/1992 | McKenney et al. | |
| 5,133,994 A * | 7/1992 | Barbaza | 427/248.1 |
| 5,150,748 A | 9/1992 | Blackmon et al. | |
| 5,178,924 A | 1/1993 | Johnson et al. | |
| 5,187,018 A | 2/1993 | Glemet | |
| 5,197,928 A | 3/1993 | Mishima et al. | |
| 5,213,868 A | 5/1993 | Liberty et al. | |
| 5,236,771 A | 8/1993 | Groshens | |
| 5,264,059 A | 11/1993 | Jacaruso et al. | |
| 5,306,188 A * | 4/1994 | Skedeleski et al. | 441/79 |
| 5,322,580 A | 6/1994 | McIntire et al. | |
| 5,330,604 A | 7/1994 | Allum et al. | |
| 5,333,532 A | 8/1994 | Smirlock et al. | |
| 5,350,545 A | 9/1994 | Streckert et al. | |
| 5,402,006 A | 3/1995 | O'Donley | |
| 5,419,927 A | 5/1995 | Dietrick | |
| 5,424,353 A | 6/1995 | Ferrier et al. | |
| 5,455,458 A | 10/1995 | Quon et al. | |
| 5,466,506 A | 11/1995 | Freitas et al. | |
| 5,542,471 A | 8/1996 | Dickinson | |
| 5,549,771 A | 8/1996 | Brooker | |
| 5,554,997 A | 9/1996 | Cobb | |
| 5,556,565 A | 9/1996 | Kirkwood et al. | |
| 5,589,015 A | 12/1996 | Fusco et al. | |
| 5,601,930 A * | 2/1997 | Mehta et al. | 428/535 |
| 5,637,375 A | 6/1997 | Hohman | |
| 5,643,390 A | 7/1997 | Don et al. | |
| 5,662,757 A | 9/1997 | Langenbrunner et al. | |
| 5,667,859 A | 9/1997 | Boyce et al. | |
| 5,672,311 A | 9/1997 | May et al. | |
| 5,674,585 A | 10/1997 | Ewing, Jr. et al. | |
| 5,683,789 A | 11/1997 | Langenbrunner et al. | |
| 5,688,426 A | 11/1997 | Kirkwood et al. | |
| 5,695,847 A | 12/1997 | Browne | |
| 5,725,707 A | 3/1998 | Koon et al. | |
| 5,726,495 A | 3/1998 | Aihara et al. | |
| 5,733,404 A | 3/1998 | Freitas et al. | |
| 5,736,222 A | 4/1998 | Childress | |
| 5,741,574 A | 4/1998 | Boyce et al. | |
| 5,762,741 A | 6/1998 | Kodokian | |
| 5,773,122 A | 6/1998 | Lennox et al. | |
| 5,789,061 A | 8/1998 | Campbell et al. | |
| 5,800,672 A | 9/1998 | Boyce et al. | |
| 5,827,383 A | 10/1998 | Campbell et al. | |
| 5,829,716 A | 11/1998 | Kirkwood et al. | |
| 5,832,594 A | 11/1998 | Avila | |
| 5,852,548 A | 12/1998 | Koon et al. | |
| 5,858,537 A | 1/1999 | Brown et al. | |
| 5,862,975 A | 1/1999 | Childress | |
| 5,863,635 A | 1/1999 | Childress | |
| 5,868,886 A | 2/1999 | Alston et al. | |
| 5,869,165 A | 2/1999 | Rorabaugh et al. | |
| 5,873,973 A | 2/1999 | Koon et al. | |
| 5,876,540 A | 3/1999 | Pannell | |
| 5,876,652 A | 3/1999 | Rorabaugh et al. | |
| 5,876,832 A | 3/1999 | Pannell | |
| 5,879,492 A | 3/1999 | Reis et al. | |
| 5,882,756 A | 3/1999 | Alston et al. | |
| 5,898,570 A | 4/1999 | Koon et al. | |
| 5,904,796 A | 5/1999 | Freuler et al. | |
| 5,916,469 A | 6/1999 | Scoles et al. | |
| 5,919,413 A | 7/1999 | Avila | |
| 5,921,754 A | 7/1999 | Freitas et al. | |
| 5,935,475 A | 8/1999 | Scoles et al. | |
| 5,935,698 A | 8/1999 | Pannell | |
| 5,942,064 A | 8/1999 | Krenkel et al. | |
| 5,948,501 A | 9/1999 | Obermeyer | |
| 5,958,550 A | 9/1999 | Childress | |
| 5,968,639 A | 10/1999 | Childress | |
| 5,972,524 A | 10/1999 | Childress | |
| 5,980,665 A | 11/1999 | Childress | |
| 6,027,798 A | 2/2000 | Childress | |
| 6,042,671 A | 3/2000 | Park et al. | |
| 6,051,089 A | 4/2000 | Palmer et al. | |
| 6,054,198 A | 4/2000 | Bunyan et al. | |
| 6,084,775 A | 7/2000 | Bartley et al. | |
| 6,090,484 A | 7/2000 | Bergerson | |
| 6,096,414 A | 8/2000 | Young | |
| 6,190,602 B1 | 2/2001 | Blaney et al. | |
| 6,231,928 B1 * | 5/2001 | McGahern | 427/391 |
| 6,268,049 B1 | 7/2001 | Childress | |
| 6,291,049 B1 | 9/2001 | Kunkel et al. | |
| 6,357,487 B2 | 3/2002 | Okawa | |
| 6,397,438 B1 | 6/2002 | DeWan | |
| 6,416,135 B1 | 7/2002 | Greubel et al. | |
| 6,425,985 B1 | 7/2002 | Hagfors et al. | |
| 6,436,506 B1 | 8/2002 | Pinter et al. | |
| 6,436,507 B1 | 8/2002 | Pannell | |
| 6,481,063 B2 | 11/2002 | Shepard et al. | |
| 6,511,563 B2 | 1/2003 | Roylance et al. | |
| 6,524,681 B1 * | 2/2003 | Seitz et al. | 428/143 |
| 6,612,523 B2 | 9/2003 | Gardner | |
| 6,645,333 B2 | 11/2003 | Johnson et al. | |
| 6,645,610 B1 | 11/2003 | Reis et al. | |
| 6,647,852 B1 | 11/2003 | Freitas et al. | |
| 6,656,403 B1 | 12/2003 | Clune et al. | |
| 6,676,785 B2 | 1/2004 | Johnson et al. | |
| 6,679,913 B2 | 1/2004 | Homsy | |
| 6,713,151 B1 | 3/2004 | Dean et al. | |
| 6,746,741 B2 | 6/2004 | Wheatley | |
| 6,821,368 B2 | 11/2004 | Benson et al. | |
| 7,208,220 B2 | 4/2007 | Yamasaki et al. | |
| 2003/0196741 A1 | 10/2003 | Burgess et al. | |
| 2003/0214064 A1 | 11/2003 | Shin et al. | |
| 2004/0081791 A1 | 4/2004 | Abrams | |
| 2004/0213942 A1 | 10/2004 | Sano | |
| 2005/0024004 A1 | 2/2005 | Rodnunsky | |
| 2005/0053787 A1 | 3/2005 | Yamasaki et al. | |

FOREIGN PATENT DOCUMENTS

| | | | |
|---|---|---|---|
| EP | 0713369 B1 | 9/2001 | |
| EP | 1428650 A1 | 6/2004 | |
| FR | 2 718 074 A1 * | 10/1995 | |
| FR | 2718074 A1 | 10/1995 | |
| JP | 4033836 A2 | 2/1992 | |
| WO | WO94/25178 | 11/1994 | |
| WO | 03020495 A1 | 3/2003 | |

OTHER PUBLICATIONS

Bossi, R. H., Nereberg, R. L. Intl. SAMPE Tech. Conf. Series 45, 1787 (2000).

Gleich, D. M. et al Intl. SAMPE Tech. Conf. Series 45, 818 (2000).

Heselhurst, R. B. Joining Composite Structures Tutorial notes SAMPE 2001.

Mekjian, A. Intl. SAMPE Tech. Conf. Series 45, 1205 (2000).

International Search Report and Written Opinion in PCT/US2005/031243 (mailed Mar. 29, 2006).

Parallel Australian patent application No. 2005279775; Examiner's Report dated Oct. 16, 2009.

Parallel European Region patent application No. 05813026.3; Examiner's Report dated Jul. 29, 2009.

Parallel Canadian patent application No. 2,620,563; Examiner's Report dated Apr. 16, 2010.

* cited by examiner

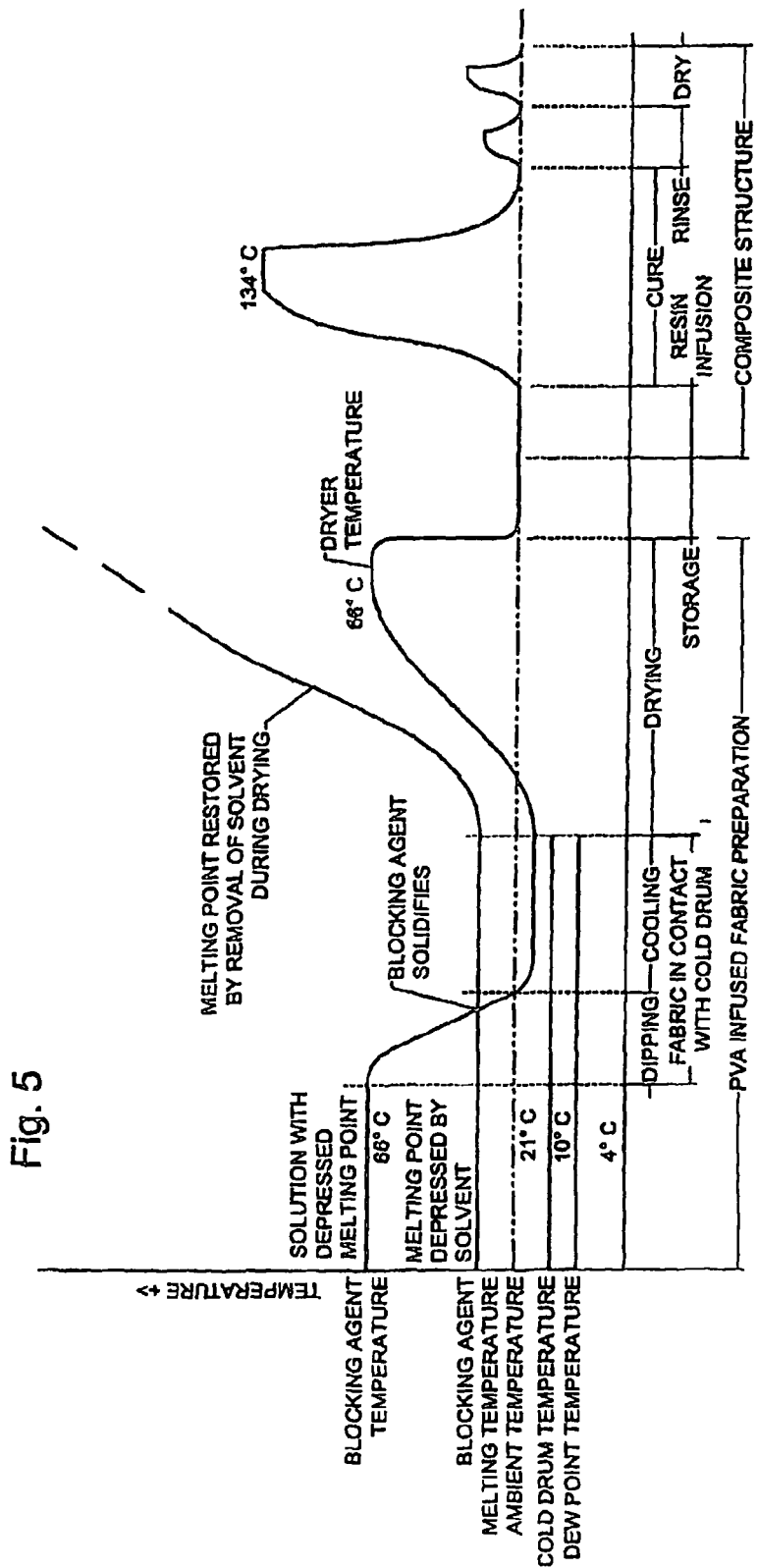

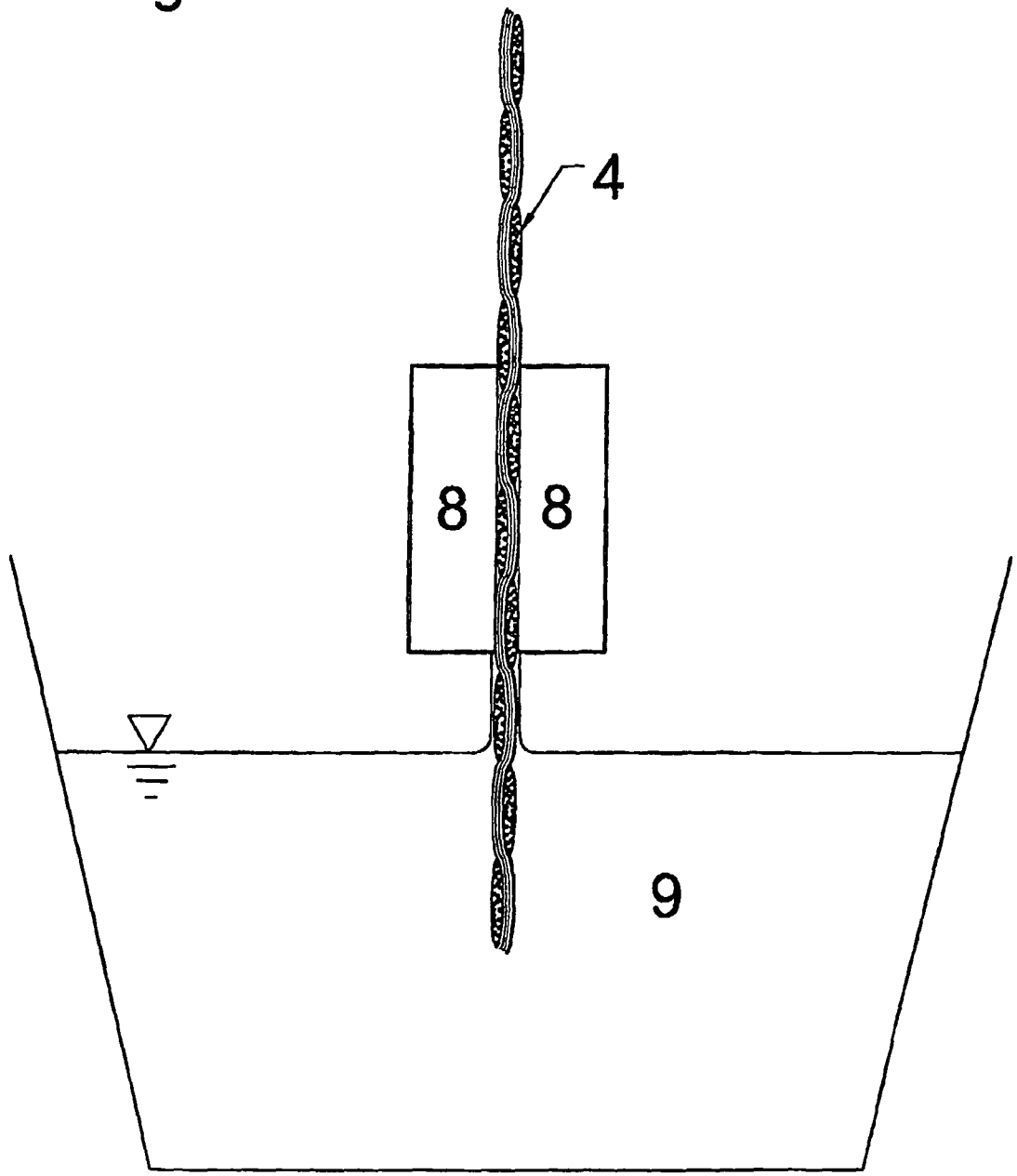

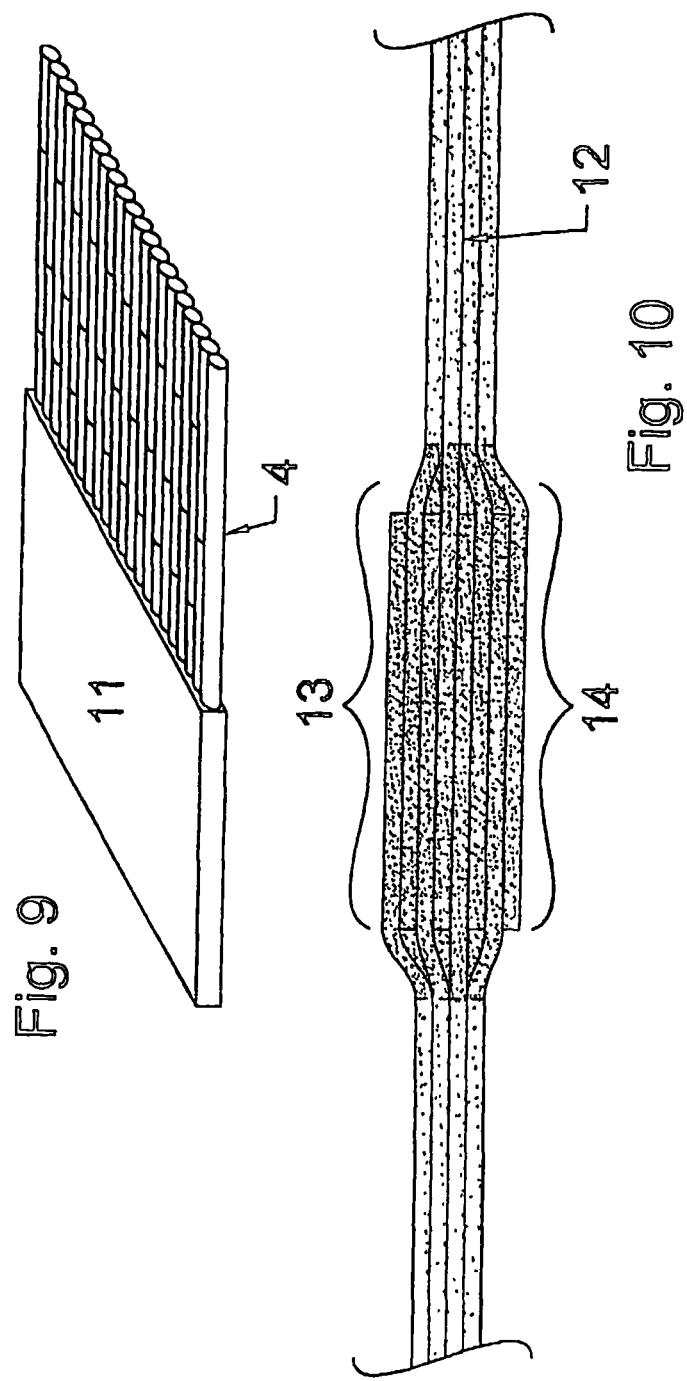

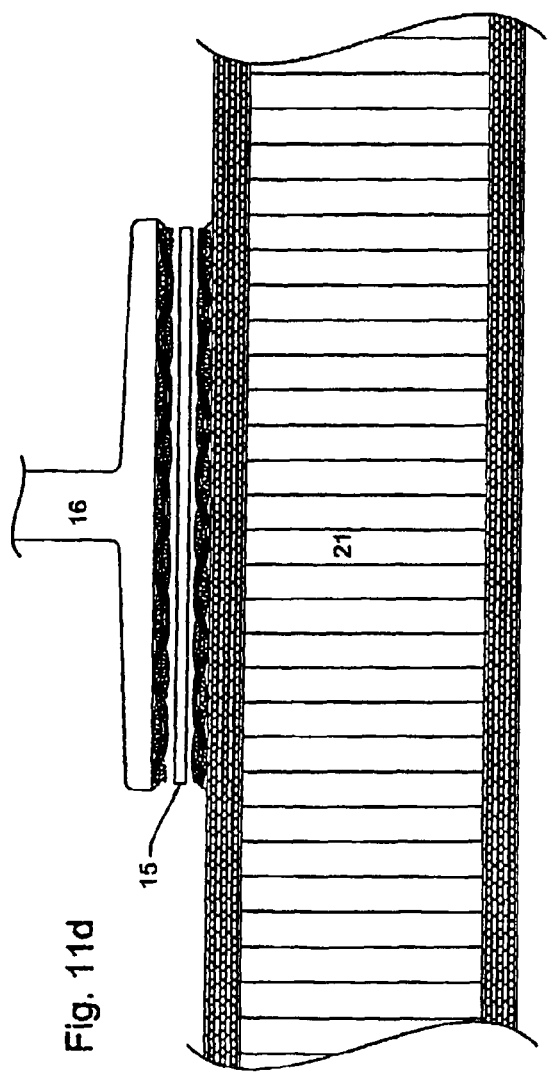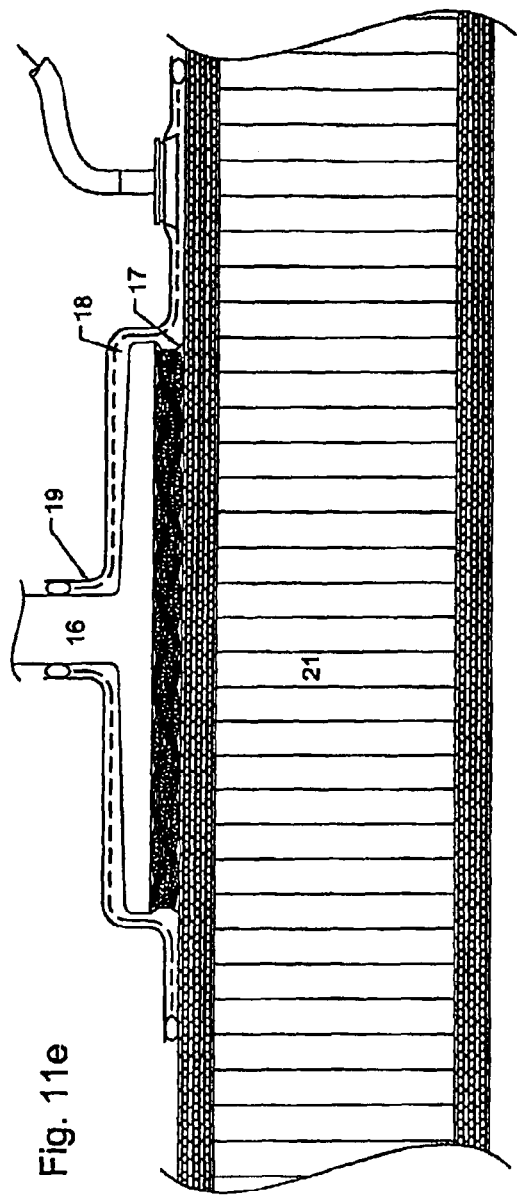

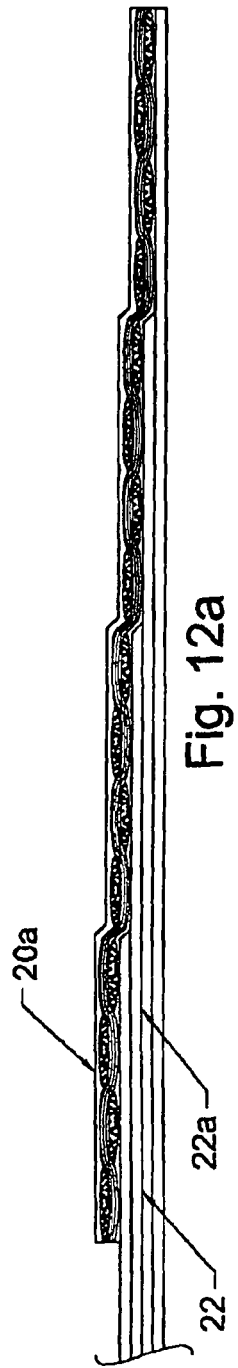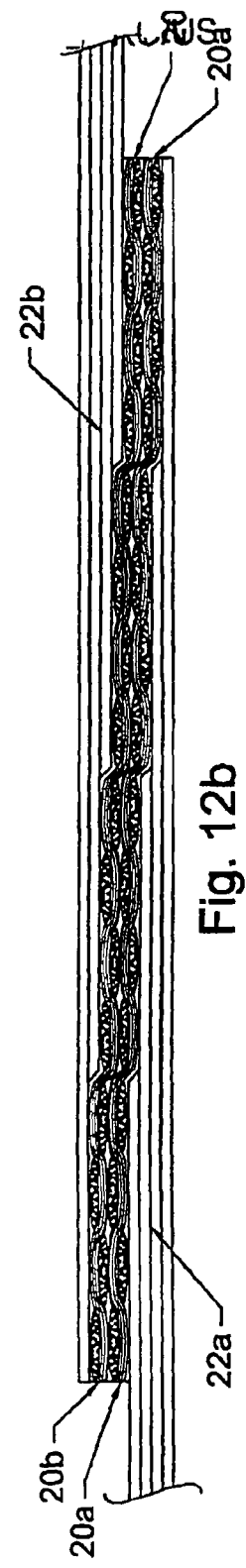

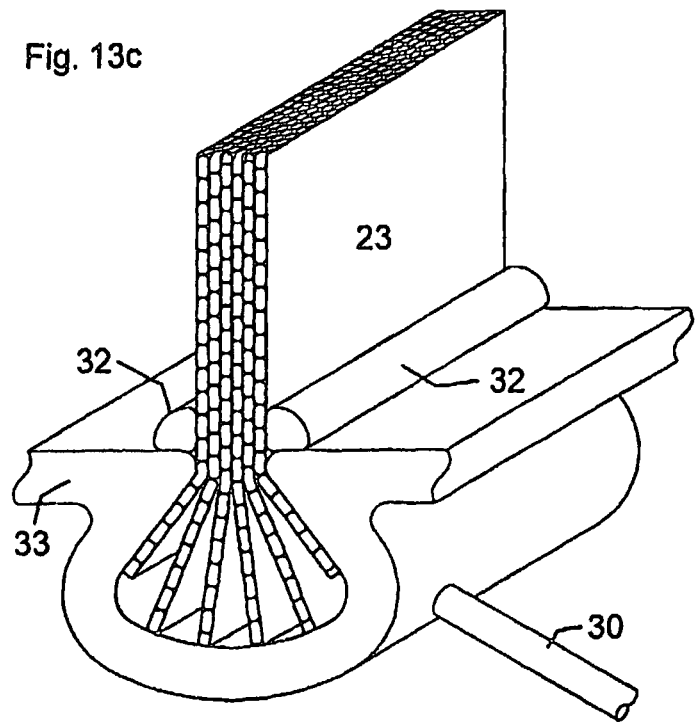
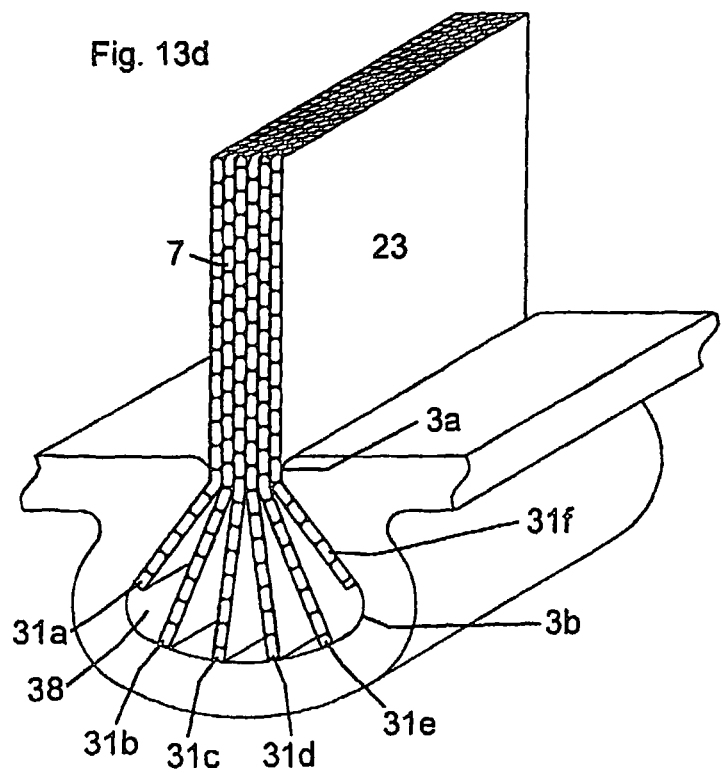

PROCESS OF MANUFACTURING FIBER REINFORCED COMPOSITE VIA SELECTIVE INFUSION OF RESIN AND RESIN BLOCKING SUBSTANCE

This is a United States national phase patent application and claims priority to PCT Application No. PCT/US2005/031243, filed 31 Aug. 2005, published on 9 Mar. 2006 as WO 2006/026734, an application claiming priority to U.S. Provisional Application 60/606,231, filed 31 Aug. 2004, said PCT and provisional applications incorporated herein by reference.

BACKGROUND OF THE INVENTION

1. Field of Invention

The present invention relates to connection of fiber reinforced structures, in particular the provision of exposed non-resin infused fiber at edges or surfaces of fiber reinforced components, which fiber may be beneficially used to reinforce subsequently formed joints between or to such fiber reinforced components.

2. Description of Related Art

Most adhesively bonded joints in fiber reinforced composites lack any continuity of reinforcement, with the notable exception of Z-pin technology such as is disclosed in U.S. Pat. No. 6,821,368 B2 to Benson et al. Continuity of fiber reinforcement across joints is desirable because the fiber reinforcement is far stronger than the polymer matrix and is stronger yet compared to adhesively bonded joints within a polymer matrix. Polymer joints lacking fiber reinforcement can be expected to lack the inherent fatigue resistance of fiber reinforced structures. Additionally, adhesively bonded joints between polymer structures are subject to environmental degradation. Cured resin systems of composite components leave relatively few sites for chemical bonding to occur when the article is later joined in a secondary bonding step. These limitations of conventional adhesively bonded joints in fiber reinforced composites have been well documented by J. M. Koyler, et al, *Intl. SAMPE Tech. Conf. Series*, 45, 365 (2000).
D. M. Gleich, et al, *Intl. SAMPE Tech. Conf. Series*, 45, 818 (2000).
R. H. Bossi, R. L. Nereberg, *Intl. SAMPE Tech. Conf. Series*, 45, 1787 (2000).
Heselhurst R. B., *Joining Composite Structures*, Tutorial notes SAMPE 2001.

The above mentioned references are hereby incorporated by reference. U.S. Pat. No. 5,464,059 to Jacaruso et al discloses partial embedment of reinforcing fabric in thermoplastic materials for subsequent connection of thermoset composite structures, but without fiber continuity through the completed thermoset/thermoplastic/thermoset joints suggested therein. The various processes for increasing the surface energy and availability of potential bond sites are labor intensive, expensive, of dubious reliability, and are subject to reversal by brief environmental exposure.

The benefits of z-axis fibers within individual composite articles are known. For example, individual plies of pre-preg material have been treated with flocked fibers in order to obtain improved inter-laminar strength. Three dimensional woven pre-forms have also been used. An example of such 3 dimensional woven pre-forms is disclosed in U.S. Pat. No. 6,712,099 B2 to Schmidt et al. Although such structures may provide superior Z axis delamination resistance within integrally cured components, such structures do not in themselves provide for increased adhesive joint strength. Several methods for providing reinforcement across joints have been proposed in the past. These include U.S. Pat. Nos. 5,879,492 and 6,645,610 B1 to Reis and Wong which disclose the use of peel ply sheets which, when peeled from the cured composite, are intended to leave embedded in the composite structure, fibers which are intended to reinforce a subsequent adhesive joint. The use of both co-woven and flocked fibers is disclosed. Such systems result in the conflicting requirements for good wetting properties of the fibers to be left behind in the cured resin, and for good release properties of the fiber to be peeled away. Obviously, this would not work well with a single type of fiber with a single type of surface treatment. Furthermore, release agents that might be applied to the fibers to be peeled may be prone to migrate during cure onto the fibers to be embedded, thus diminishing the strength and reliability of any adhesive joint which such embedded fibers are intended to reinforce.

Electro-statically flocked carbon fibers have also been used for the purpose of enhancing heat transfer from electrical components and for heat transfer in Stirling engines.

SUMMARY OF INVENTION

It is an object of one aspect of this invention to provide high strength connections between various fiber-reinforced structural components. For example, the interior of an aircraft fuselage structure might be provided with a generally circular zone of exposed fibers for the purpose of being adhesively bonded to a pressure bulkhead with its fuselage-fitting perimeter featuring similarly exposed fibers. Upon bonding, fibers continuous from within the fuselage structure are commingled and co-embedded in cured adhesive with fibers continuous from within the pressure bulkhead structure. The integrity of the combined structure is thus enhanced by continuity of fiber across the adhesive-to-cured-resin interfaces and thus does not rely on the strength of the adhesive-to-cured-resin bonds and also does not rely on the strength of un-reinforced adhesive. Loads may be reliably transferred from fiber to resin to fiber without the requirement for tensile load transfer across adhesive bond lines. Stresses within the adhesive itself are also reduced in accordance with the degree of fiber overlap achieved within the adhesive. Fiber overlap may be tailored to load requirements. For example, opposing electro-statically flocked bonding strips might be used in order to maximize the proportion of Z-axis fiber alignment within the joint. Connections with predominately shear loads might be adequately provided with partial exposure of woven reinforcing fabrics. Knitted fabrics would be expected to provide joint properties intermediate to those provided by flocked bonding strips and square woven fabric.

It is an object of an aspect of a further embodiment of this invention to provide a high strength connection between an underlying structure and a coating system. For example, a composite spacecraft structure might include surface zones of exposed fiber corresponding to zones of maximum reentry heating. Insulating refractory materials such as silica foam or alumina fiber may be readily attached to such a surface with adhesives such as RTV silicone elastomer. In this manner, the adhesive may be reliably attached to the underlying composite structure without reliance on a chemical bond to a cured resin surface which may be relatively chemically inert. Other example coating systems to which this invention is applicable include epoxy paint, elastomeric coatings, thermoplastic coatings, thermoset coatings such as phenolic coatings, radar absorbing coatings, electrochromic coatings, chemically resistant coatings, refractory coatings, electrically conductive coatings for EMI protection or lightening strike protection, ablative coatings, etc. Any material into which the fibers, exposed in accordance with this invention, may be embedded may be reliably attached to the underlying structure into which said fibers are continuous.

It is an object of a further aspect of this invention to provide a high strength, yet flexible, connection between several structural components. For example, the bonding of two relatively stiff structures which may move relative to each other may require a flexible joint in order to reduce joint loads to within safe limits. A landing gear or engine attachment to a fuselage might fall into this category. Provision, in accordance with this invention, of exposed fiber at the surfaces of the parts to be connected allows the creation of an elastomeric joint between otherwise relatively rigid structures. Integration of the exposed fibers of each structure into such an elastomeric joint provides not only joint attachment reliability but also the possibility of carrying substantial tensile loads through such a joint. Elastomeric connections of prior art have primarily used elastomeric elements in compression. In cases where loads reverse direction, redundant elastomeric elements have been required, with only one or the other elastomeric element carrying a load at any one time.

It is a further object of this invention to provide, within a zone of desired structural flexibility, a flexible matrix around fibers that may be generally continuous between two or more relatively articulated structural elements. For example, some of the structural fibers that comprise the reinforcement of a wing, wherein they are embedded in a rigid polymer matrix, might extend there from in exposed form through a zone of desired flexibility, into an aileron wherein they are embedded again in a rigid polymer matrix. The zone of exposed fiber would thus act as a hinge means and might be used with or without subsequent embedment in a flexible matrix such as elastomeric epoxy.

In accordance with a further aspect of the aforementioned embodiment of this invention, one or more sheets of reinforcing fabric may be selectively infused with resin and resin blocking substance in a pattern which provides for features desired in a cured component made therefrom. Such selective infusion may be accomplished by screen printing or ink jet printing, for example. Such sheets may then be assembled and cured after which zones with resin blocking substance may be washed clean of such substance and used to form hinges, with or without the addition of infused elastomer, as well as bonds.

It is a further object of this invention to provide improved discrete fasteners particularly advantageous for the connection of fiber reinforced structures, equivalent, for example, to nails, staples, or rivets. For example, a 5 cm length of carbon fiber yarn might be infused 1 cm on each end with rigid (non-plasticized) PVA, with the PVA further formed into sharp ends. This yarn might then be formed into the shape of a common paper staple with legs of 2 cm length. All of the non-PVA infused yarn would then be infused with resin and cured to a rigid form. Such a staple could be inserted through the thickness of a prepreg laminate, with the sharp PVA infused ends extending into a penetrable elastomeric pad similar to that used during the curing of structures incorporating Z-pins. After laminate curing, the PVA could be dissolved and the fibers at the ends of the "staple" spread out and glued to the surface of the laminate.

According to one aspect of an embodiment of the present invention, a zone of thermal gradient may be established normal to a desired boundary between resin impregnated fiber and non-resin impregnated fiber. A molten resin blocking substance such as paraffin may be supplied to the reinforcing fibers near the higher temperature end of the thermal gradient zone. The resin blocking substance, such as paraffin, will wet the heated fibers and follow the fibers by capillary action to a boundary where the temperature of the fiber causes solidification of the paraffin and cessation of capillary transport. Subsequent resin infusion of the portion of fiber not infused with paraffin results in a distinct resin boundary within the fiber matrix. Curing of the resin may be carried out at temperatures below the melting point of the resin blocking substance such as paraffin. After the resin is cured, the paraffin may be removed by vacuum sublimation followed by solution in citric acid solution, for example. This sequence leaves exposed non-resin infused fibers which may be readily incorporated into a secondary joint. For example, the marginal edges of two adjoining parts may be joined by overlapping or otherwise interlocking the exposed fibers of each part followed by resin infusion of the zone of interlocked fibers. The resulting structure benefits from continuity of reinforcement through the joint.

According to an aspect of another embodiment of the present invention a solution of plasticized polyvinyl alcohol (PVA) may be used to infuse a zone of fiber and to create a barrier for use in controlling the subsequent infusion of resin. After solidification, the plasticized PVA forms a flexible and heat resistant barrier which selectively blocks resin infusion during heated cure cycles, which may involve exothermically curing resin systems. Upon curing of the resin system, the PVA may be dissolved with warm water to leave exposed fibers which are useful for construction of subsequent joints.

According to a further aspect of one embodiment of this invention, a metal or alloy of metals may be infused under temperature gradient control into a fiber matrix. The remaining, non-metal infused, portion of the fiber matrix may subsequently be resin infused and the resin cured. Removal of the metal, if desired, may be accomplished by melting, chemical corrosion, or electrochemical removal. For certain applications the metal may be left in place to provide enhanced electrical properties, for example.

According to a further aspect of this invention a soluble flexible sheet may anchor short lengths of fiber oriented primarily normal to the plane of the elastomeric sheet. Such a sheet may be applied to the surface of an uncured composite structure and left in place during curing. Subsequent to curing, the flexible sheet may be dissolved, leaving exposed fibers protruding from the surface of the cured composite structure.

According to one aspect of a further embodiment of this invention, a fabric of soluble fiber such as PVA may be used in a manner similar to the supporting or ground fabric of carpet or velour. Reinforcing yarns, of carbon fiber for example, may subsequently be inserted and attached in accordance with conventional manufacturing techniques for carpets or incorporated as the looped fabric element of velour. The supporting or ground fabric surface may then be sealed with a flexible soluble filler, such as PVA. Such a fabric may then be applied to the surface of an uncured composite structure, with the exposed reinforcing fibers oriented towards the underlying structure. Resin to be cured may be pre-impregnated into such a fabric or may be infused into the fabric and the composite structure as a whole in accordance with vacuum assisted resin transfer molding practice, for example. After curing of the composite article, the soluble fabric and soluble filler would be dissolved, leaving exposed reinforcing fibers for subsequent use.

Alternatively, in accordance with a further aspect of an embodiment of this invention, a soluble polymer film, such as PVA compound in a softened and adhesive state, may have joint reinforcing fibers inserted therein endwise by means of electrostatic flocking. Electrostatic flocking has been used to insert in excess of 150,000 fibers per square inch. Upon hardening of the polymer film, the resulting flexible fiber bearing sheet may be applied to a surface of an uncured composite article, which surface is intended for subsequent bonding. In such a configuration, the non-fiber bearing face of the flexible polymer film would remain exposed while the fibers protruding there from would be pressed into and intermingled with the underlying fibers of the composite article. The aforementioned steps may occur either before or after introduction of the resin with which the article is ultimately infused. Upon curing of the resin infused article, the soluble polymer film may be dissolved and rinsed away, leaving a fuzzy surface well suited for subsequent adhesive bonding or for coating.

In accordance with a further aspect of the above mentioned embodiment of the present invention, joint reinforcing fibers may be applied in a purposely non-uniform orientation such as by means of pneumatic flocking.

In accordance with a further aspect of the above mentioned embodiments, a soluble adhesive may be used secure flocked joint reinforcing fibers to a sheet such as cloth woven from PVA fibers.

In accordance with a further aspect of the above mentioned embodiments, a soluble adhesive may be used to secure flocked joint reinforcing fibers to a non-soluble sheet to be mechanically removed at a later manufacturing stage by peeling, for example.

In accordance with a further aspect of this invention, flocking, with or without an electrostatic component, may be used to apply joint reinforcing fibers directly to the surface of a composite article after resin infusion of said article but prior to curing. Such a method eliminates the rinse step and may be useful in conjunction with articles fabricated by wet lay-up methods. In this case, the surface to feature exposed joint reinforcing fibers would not be conventionally vacuum bagged, but would instead be held at a gas pressure sufficient to balance the combined effects of surface tension and resin hydrostatic pressure: I case the gas pressure is allowed to be atmospheric pressure, control would be by means of resin hydrostatic pressure and design control of the wetting characteristics of the joint reinforcing fiber. The wetting characteristics of the joint reinforcing fabric would preferably be selected so as to completely wet the underlying structural fibers while only partially wetting the joint reinforcing fibers, based on surface energy, fiber diameter, and fiber spacing.

In accordance with a further aspect of this invention, a joint reinforcing fabric may be applied to the to-later-be-joined exterior surfaces of a composite article. Said joint reinforcing fabric would have controlled wetting characteristics, such that the underlying structural reinforcing fibers would be thoroughly wet out at a predetermined resin hydrostatic pressure, while the joint reinforcing fabric would become only partially wetted. Upon first stage curing of the composite article, the to-later-be-joined exterior surfaces would feature partially embedded joint reinforcement fibers.

In accordance with one aspect of a further embodiment of this invention, a joint may be provided in which one or more components are match molded to each other. For example, a laminate or sandwich structure may be built to include one or more surface zones wherein the outer fibers are protected by a resin blocking substance. Either before or after curing of such a structure, additional structures may be built thereon which incorporate corresponding zones of resin blocked fiber in a back-to-back configuration with resin blocked fiber elements of the first structure. Upon curing of such assembled structures in their respective assembled positions, the structures may be disassembled from each other and their respective bonding zones cleaned of resin blocking substance. Such disassembly may be useful or required for the removal of mandrels or the insertion of other components, for example. After removal of resin blocking substance, the structures may subsequently be reassembled and adhesively bonded to each other with an assured fit.

In accordance with a further aspect of one embodiment of this invention, inert wedges may be used to beneficially position, relative to each other, the marginal edges of a plurality of reinforcing plies. Such reinforcing plies are preferably through-thickness resin blocked within their length in contact with the wedges, except with the possible exception of the zones nearest the narrow ends of the wedges. In this manner, the fibers will fan out into a dovetail groove where they may be secured by a secondary resin infusion process.

In accordance with a further aspect of this invention, a thermal gradient may be used to directly control resin infusion in order to establish a desired resin infusion configuration or extent. In order to cure the resin without disturbing the resin configuration, a radiation source may be used in order to fix the resin in position while maintaining a sufficiently low temperature to prevent resin migration. Electron beam curing is preferred because of controllability and penetration. Ultraviolet, X-ray, and Gamma ray curing would also be suitable. In the case of curing with ultraviolet light, glass fibers may be configured to both direct light and to provide structural reinforcement.

In accordance with one aspect of a further embodiment of this invention, an assembly of reinforcing fabric may be infused in conjunction with the presence of curing radiation provided at locations of intended lack of infusion. In this manner, resin approaching the radiation source may be caused to cure, forming a dam that prevents further resin penetration. For example, an ultraviolet light source may be used to create a resin barrier just beneath the uppermost fibers on a selected surface of an article being infused. The resin dam thus created provides un-infused fibers that may be beneficially used to adhere other components or special coatings. Such a radiation cure of near surface resin may be immediately followed by a thermal cure of the remaining resin. Using prior art techniques, the drop in viscosity with the onset of exothermic cure would make controlled limiting of resin infusion unlikely.

In accordance with a further embodiment of one aspect of the present invention, a thermal gradient may be used to control the extent of infusion of a thermoplastic into a fiber matrix. Subsequent infusion of thermoset resin into the remainder of the fiber matrix can then be used to yield a part which may be thermally bonded to another such part with continuity of fiber reinforcement across the resin interfaces. This method combines the high glass transition temperature and favorable structural properties of thermoset resins with the weldability of thermoplastic parts.

The terms "joint reinforcing fibers" is meant to include fibers the function of which is to adhere a coating system to an article. The term "resin" is meant to include any polymerizable or cross-linkable compound which, when cured, provides a useful matrix connecting the fiber matrix from within. Examples include epoxy resins, polyester resins, acrylic resins, phenolic resins, vinyl resins, polyamides, silicones, and bis-maleimides.

BRIEF DESCRIPTION OF THE DRAWINGS

FIG. 5 is an example time-temperature diagram of a process in accordance with one aspect of this invention.

FIG. 8 is a schematic illustrating the controlled end-wise infusion of a resin blocking substance in accordance with one aspect of the present invention.

FIG. 9 is an illustration of a unidirectional reinforcing tape prepared in accordance with one aspect of the present invention.

FIG. 10 illustrates a joint connecting previously cured laminates in accordance with one aspect of the present invention.

FIGS. 11a through 11e illustrate the sequence of construction of a joint between a strut and a honeycomb sandwich structure in accordance with the present invention.

FIGS. 12a and 12b illustrate the preparation of a stepped lap joint in accordance with one aspect of the present invention.

FIG. 13a through 13d illustrates the steps by which a dovetail joint may be produced in accordance with the present invention.

DETAILED DESCRIPTION OF THE PREFERRED EMBODIMENTS

Figure 1:
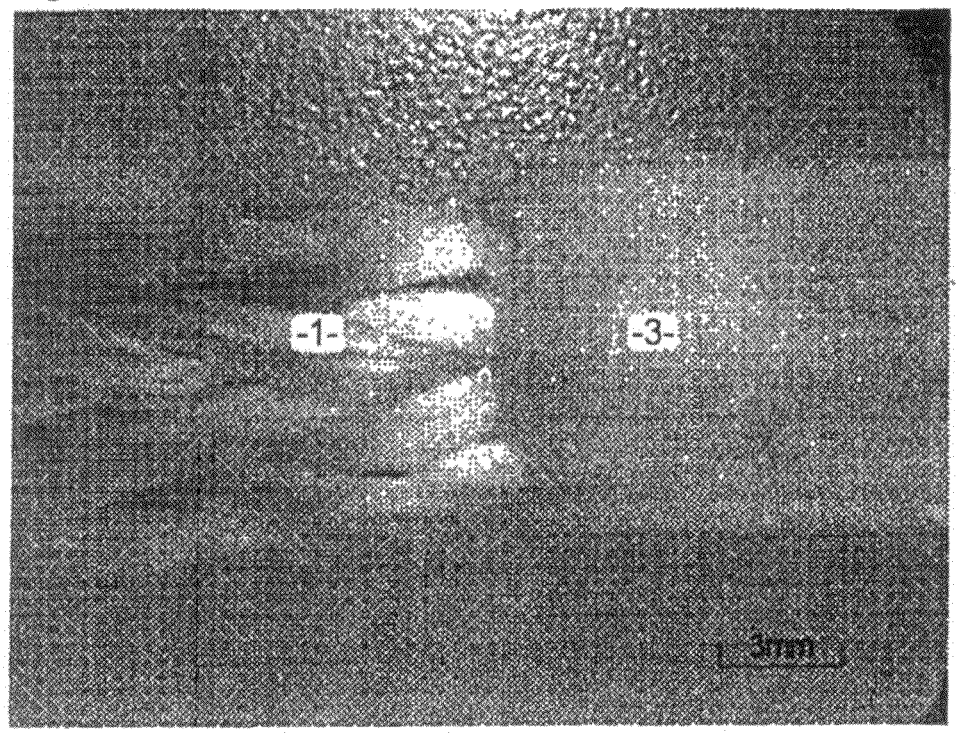
FIGS. 1 and 2 are photos of a braided glass cord depicting a zone which was resin blocked using paraffin wax infused under a controlled thermal gradient and from which the paraffin was subsequently removed by vacuum sublimation and subsequent solution.
Figure 2:
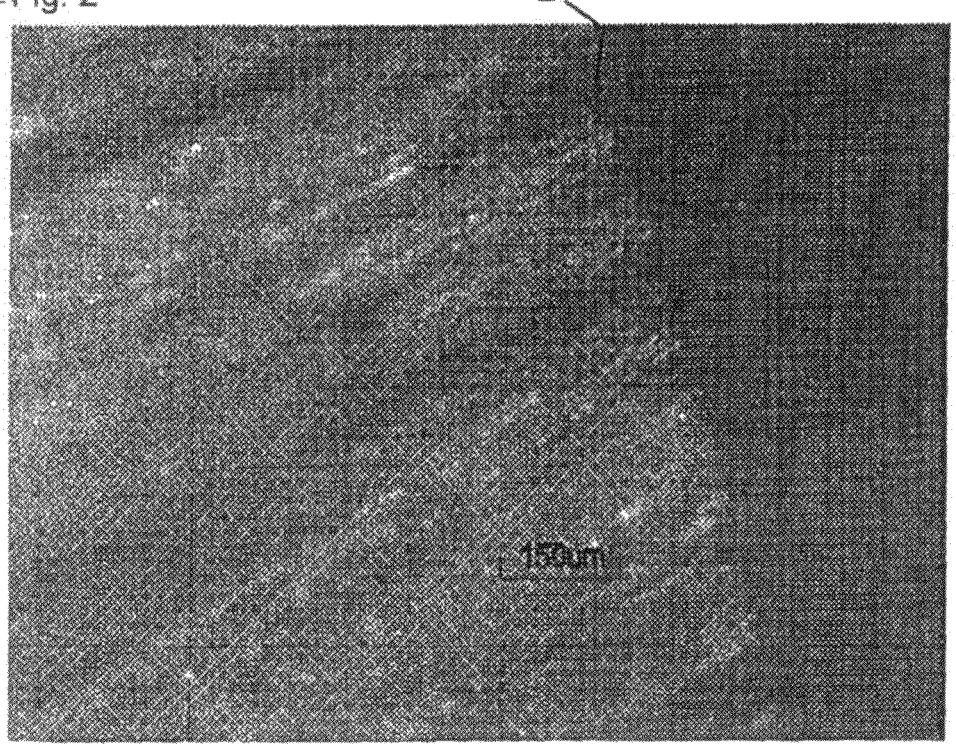

Referring to FIGS. 1 and 2, a braided glass fiber cord at an initial temperature of 20 deg C., has been momentarily dipped in molten paraffin so as to allow infusion (wicking) of the molten paraffin to an intended future resin boundary. The infusion extends to a boundary 2 at which the molten paraffin dropped in temperature sufficiently to begin solidification and ceases to infuse. A transient temperature gradient thus controlled the extent of paraffin infusion. The paraffin in this case was used as a resin blocking substance. The specimen shown in FIGS. 1 and 2 was subsequently cooled to solidify the paraffin, infused with epoxy resin which that was then allowed to cure, and then cleaned of paraffin by sublimation and solution. The infusion of epoxy resin (under effectively isothermal conditions) was precisely controlled by the paraffin infusion boundary 2 between glass fiber infused with subsequently cured epoxy resin 3 and non-infused glass fiber 1. Such an arrangement is useful for a wide variety of fiber reinforced composite articles that are to be subsequently bonded, or for which flexible non-infused fibers may serve other purposes such as for flexure, heat transfer, or bonding of special purpose coatings thereto.

Figure 3:
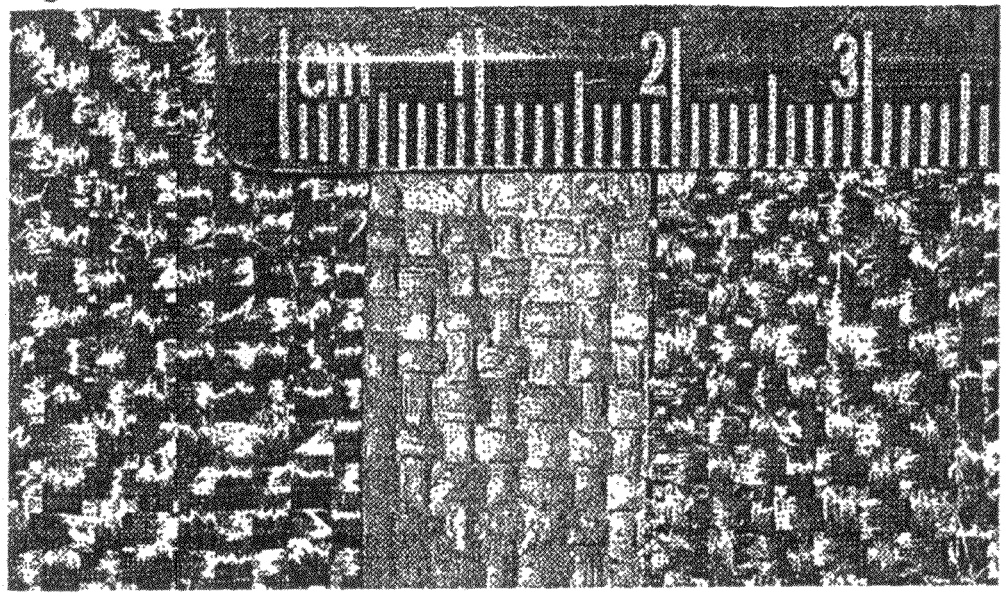
FIG. 3 is a photo of a carbon fabric, from left to right, untreated, the PVA infused surface, and the surface opposite the PVA infused surface.

Referring to FIG. 3, a square woven carbon fiber cloth is shown on the left side of the photo. The center portion of the photo shows one surface of the same woven carbon fiber cloth infused with plasticized polyvinyl alcohol (PVA) under conditions of a through-thickness temperature gradient. The left hand portion of the photo of FIG. 3 shows the surface of the cloth opposite the surface from which the PVA was infused. This was the cold surface. The through-thickness temperature gradient caused the PVA to gel and cease infusion at the intended boundary within the material. A specimen was thus produced which may be used as the outermost layer of reinforcement, at a portion of a surface to be subsequently bonded, of a fiber reinforced component. The exposed fibers would be incorporated directly into the component, while the PVA infused fibers would be protected or blocked from resin infusion until after the resin was cured and could no longer migrate, after which the PVA could be removed with hot water at any time prior to final assembly and bonding. It should be noted that the PVA treated fabric of the type shown in FIG. 3 may also be infused with resin and then partially cured or gelled to provide a pre-preg material suitable for use on to-be-subsequently-bonded-or-coated surfaces of articles built up using pre-preg materials.

Figure 4:
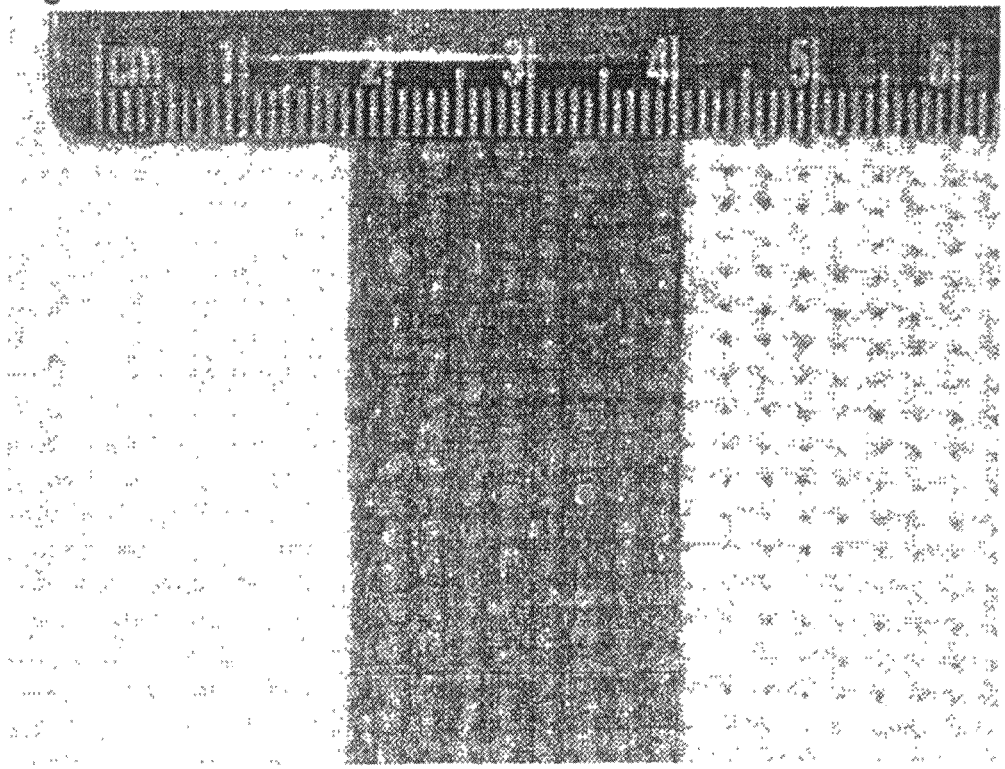
FIG. 4 is a photo of a carbon fabric, from left to right, untreated, the PVA infused surface, and the surface opposite the PVA infused surface.

Referring to FIG. 4 a woven glass fiber cloth is shown. The left hand portion of the photo shows untreated fabric, the middle portion of the photo shows the PVA treated surface, and the right hand side of the photo shows the surface opposite the PVA treated side. All of the description relating to FIG. 3 also applies to FIG. 4, except for the difference in fabric material; i.e., carbon for FIG. 3 and glass for FIG. 4.

Referring now to FIG. 5, the principal stages of a process sequence, in accordance with one aspect of the present invention, are illustrated. Principal stages sequentially are: 1) A melting point reduced resin blocking substance is prepared. A cold drum or other suitable heat transfer surface is temperature controlled to a temperature below the gel point of the melting point reduced resin blocking substance. Note that the aforementioned stage is preparatory in nature and that the following fabric treatment stages are generally suitable for a continuous process flow. 2) Fabric is brought into tight contact with the cold drum while molten melting point reduced resin blocking substance is brought into contact, by dipping for example, with the fabric. The melting point reduced resin blocking substance may be, for example, PVA in aqueous solution. PVA, if used, is preferably plasticized with 1 to 3% glycerol or ethylene glycol in order to provide flexibility to the infused fabric. As the resin blocking substance penetrates the fabric it cools and eventually gels, at which point it ceases penetration and defines a boundary for future resin infusion from the opposite direction. It should be noted that the temperature gradient required in order to infuse then stop the resin blocking substance may be either transient or steady state in nature or a combination thereof. A temperature gradient of some type is, in any case, a salient feature of this process. 3) Additional cooling gels and temporarily secures the resin blocking substance within the fabric. 4) Drying provides a robust coating on one side of the treated fabric, allowing the fabric to be shipped, stored, and handled without damage. Note that succeeding steps are no longer directly associated with the preceding continuous-process compatible steps. 5) The fabric is used as intended in order to provide exposed fibers at the surface of a resin infused fiber reinforced component. The curing of such fiber reinforced components may require elevated curing temperatures which would have caused the original melting point reduced resin blocking substance to melt. The dry form of the resin blocking substance is, conversely, compatible with such elevated temperature cure cycles. 6) After curing of the fiber reinforced component, but anytime up until bonding to the surface of the component is required, the resin blocking substance may be dissolved or otherwise removed from the surface of the component in order to provide exposed fibers to which a reliable bond may be readily achieved. It should be noted that it may be desirable to transport and store such components with the resin blocking substance still in place in order to prevent damage to or contamination of the to-be-bonded fibers.

Figure 6A:
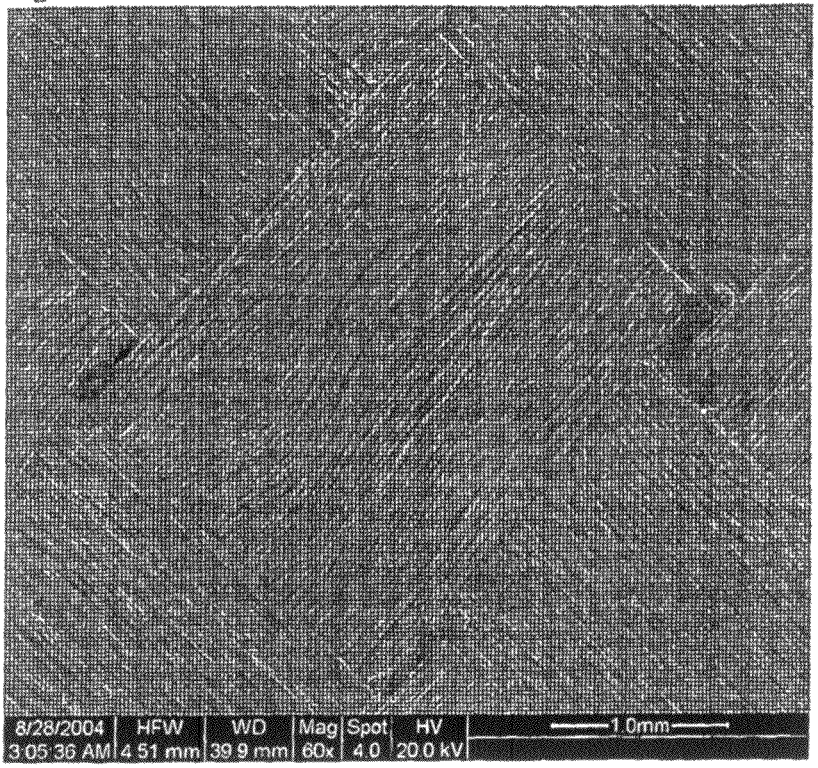
FIGS. 6a and 6b are scanning electron micrographs of carbon fibers exposed on the surface of a cured composite structure prepared in accordance with one aspect of this invention.
Figure 6B:
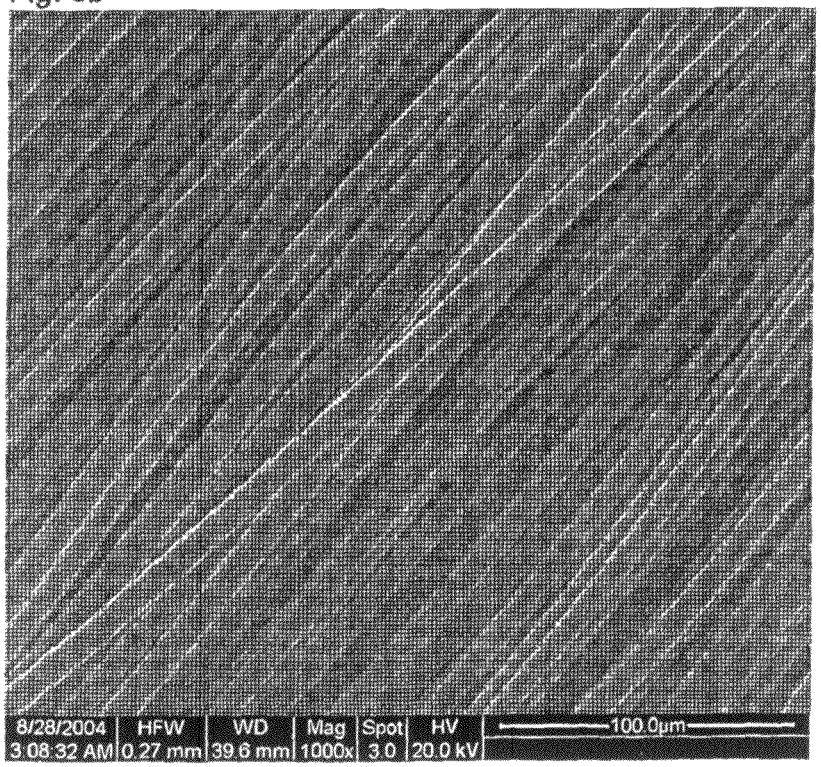

Referring to FIGS. 6a and 6b, exposed carbon fibers within the surface of a square woven carbon fiber fabric are shown in scanning electron micrographs. This specimen was prepared by the use of thermal gradient controlled infusion of melting point reduced plasticized PVA into the surface of the fabric shown. The fabric prepared in accordance with this invention was then incorporated with its resin blocked fibers toward the surface as the outermost layer of a multi-layer laminate. Infusion of epoxy resin into the fibers shown in the electron micrographs of FIGS. 6a and 6b was thus prevented. After curing of the epoxy the resin blocking PVA compound was removed with hot water. This specimen provides a surface which provides continuity of reinforcement from within the specimen into subsequently applied adhesives or coatings.

Figure 7:
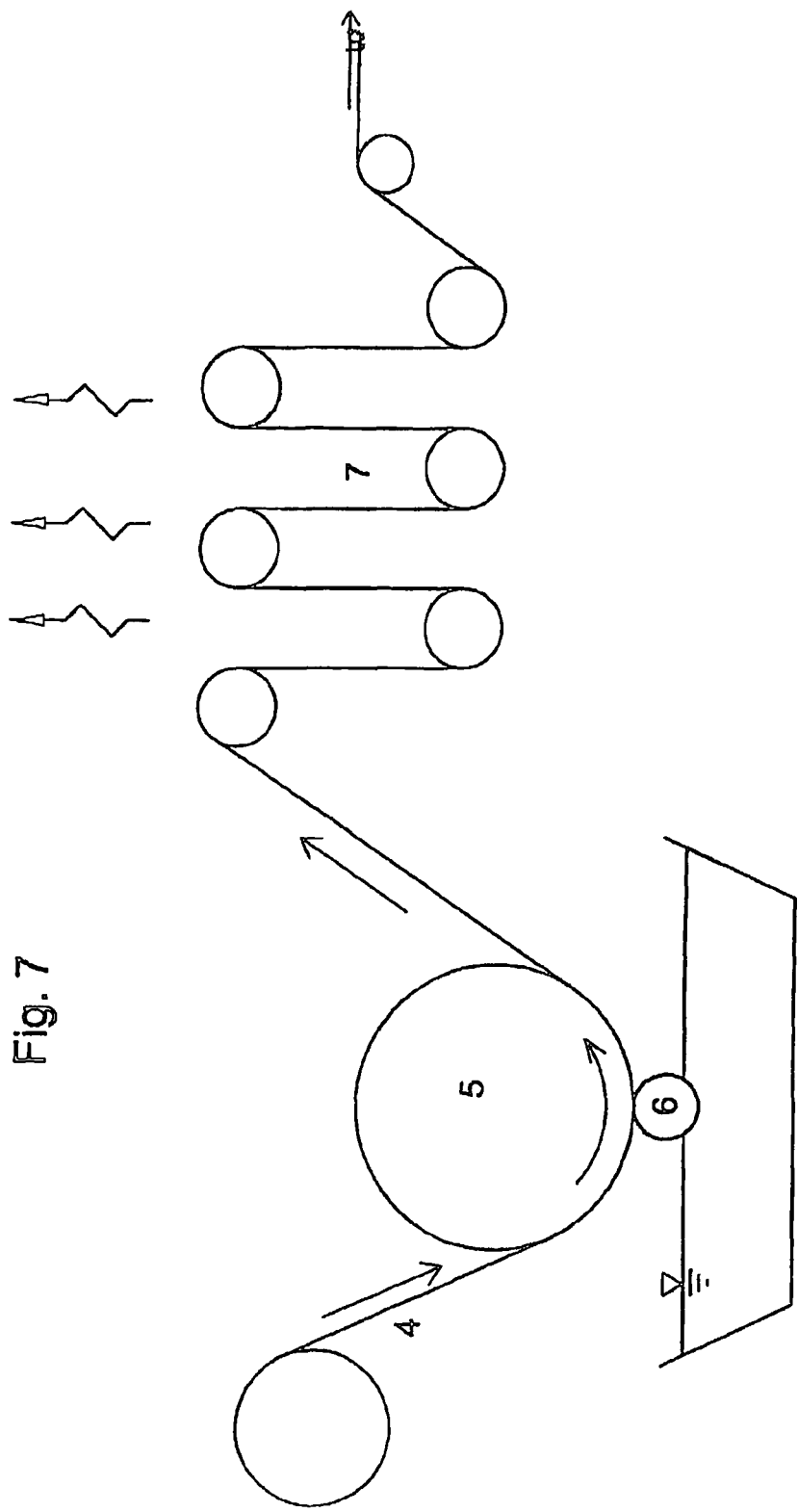
FIG. 7 is a schematic diagram illustrating the infusion of reinforcing fabric with resin blocking substance in accordance with one aspect of the present invention.

Referring to FIG. 7, the dipping stage of FIG. 5 is illustrated. Fabric 4 is held against cold drum 5 by tension. Applicator roll 6 applies a resin blocking substance such as melting point reduced plasticized PVA to the surface of the fabric. The dew point in the vicinity of the cold drum should be held below the temperature of the cold drum. Condensed water on the cold drum could wick into the fabric and come into contact with the resin blocking substance, further depressing its melting point and causing uncontrolled infusion of the resin blocking substance into the fabric. The speed and temperature of the cold drum may be controlled in order to obtain optimum penetration of the resin blocking substance. Approximately 50% through thickness penetration may be desirable for many applications. A dryer 7 renders the coated fabric non-sticky and suitable for handling, storage, and subsequent resin infusion or coating application. It should be noted that flexible coatings may be applied to the non-resin-blocked surface of the fabric prior to incorporation into the final article. In such case the resin blocking substance would be dissolved prior to assembly.

Referring to FIG. 8, a process is illustrated wherein a temperature gradient is established in order to control edgewise infusion of a resin blocking substance into the edge or end of a sheet fabric. Heat sink 8 creates a cold zone within fabric 4 in order to limit infusion of resin blocking substance 9.

Referring to FIG. 9, fabric 4 is infused on its end with resin blocking substance 9 to form a resin blocker infused zone 11.

Referring to FIG. 10, the fabric may then be assembled, infused with resin and cured in order to form a laminate 12 with edges 13 suitable for creation of high strength interleaved joints 14. After curing of such a laminate 12, the blocking substance may be removed from the edges of the fabric in order to allow interleaving and adhesive of the fabric layers.

Figure 11A:
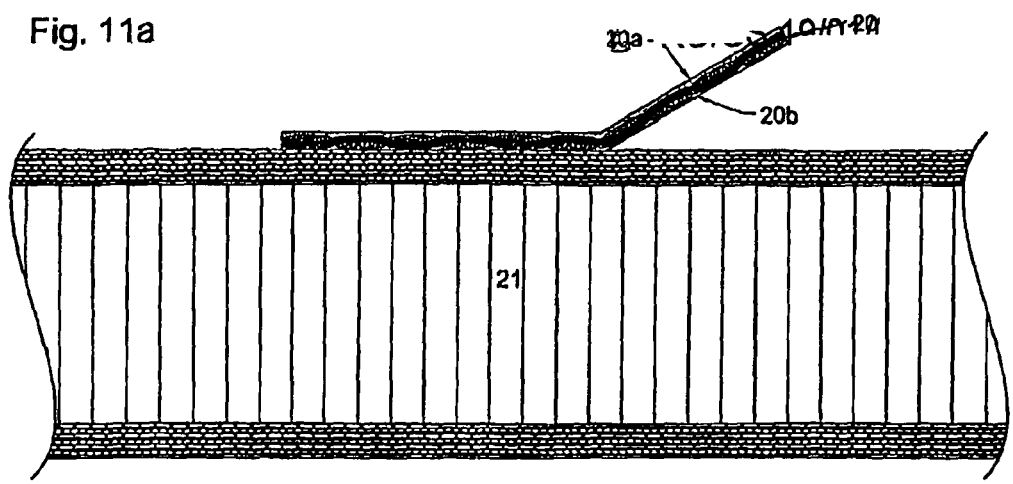
Figure 11B:
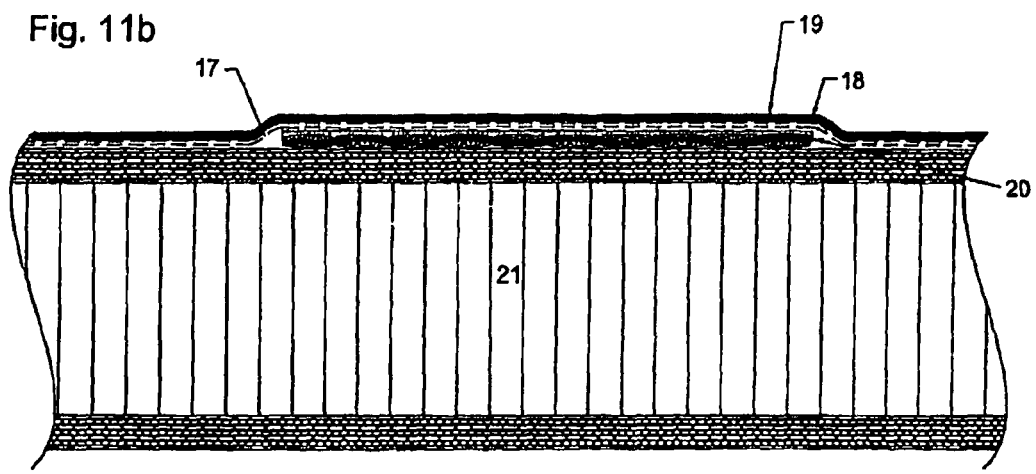
Figure 11C:
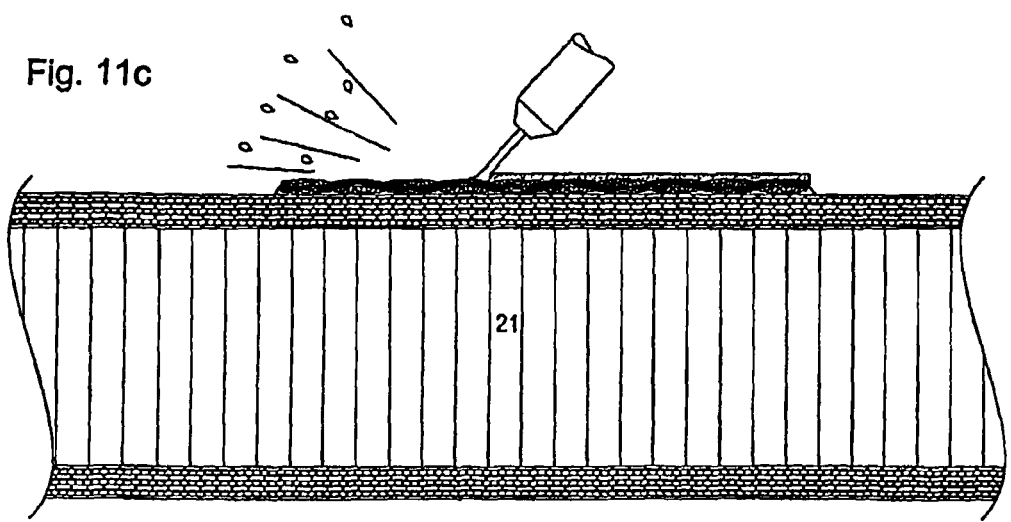

Referring to FIGS. 11a, 11b, 11c, 11d, and 11e, the salient steps for bonding a rib to a honeycomb panel are illustrated. FIG. 11a shows the application of a prepared strip of fabric 20 which is resin blocked on one surface 20a and infused with pre-preg resin on the other surface 20b. The pre-preg surface 20b is applied to the uncured honeycomb structure 21 which is also of pre-preg construction. FIG. 11b shows the arrangement of peel ply 17, breather 18 and vacuum bag 19 relative to the prepared strip of fabric 20. FIG. 11c shows the removal, after curing, of the resin blocking substance. FIG. 11d shows the application of strip (B-stage) adhesive 15 between the aforementioned prepared surface and the similarly prepared surface of a rib 16. FIG. 11e illustrates the arrangement of peel ply, breather and vacuum bag relative to the prepared joint in preparation for curing of the joining adhesive.

Referring to FIGS. 12a and 12b, a stepped lap joint is illustrated in accordance with one aspect of the present invention. Laminate 22a is co-cured with bonding prepared bonding strip 20a. Laminate 22b is likewise co-cured with bonding strip 20b. The joint is completed by removal of the resin blocking substance from bonding strips 20a and 20b and the application and curing of adhesive. Adhesive may be of any suitable variety such as liquid, gel, paste, or B-stage sheet adhesive. In the case of sheet adhesive, vacuum bag curing as illustrated in FIG. 11e might be used.

Figure 13A:
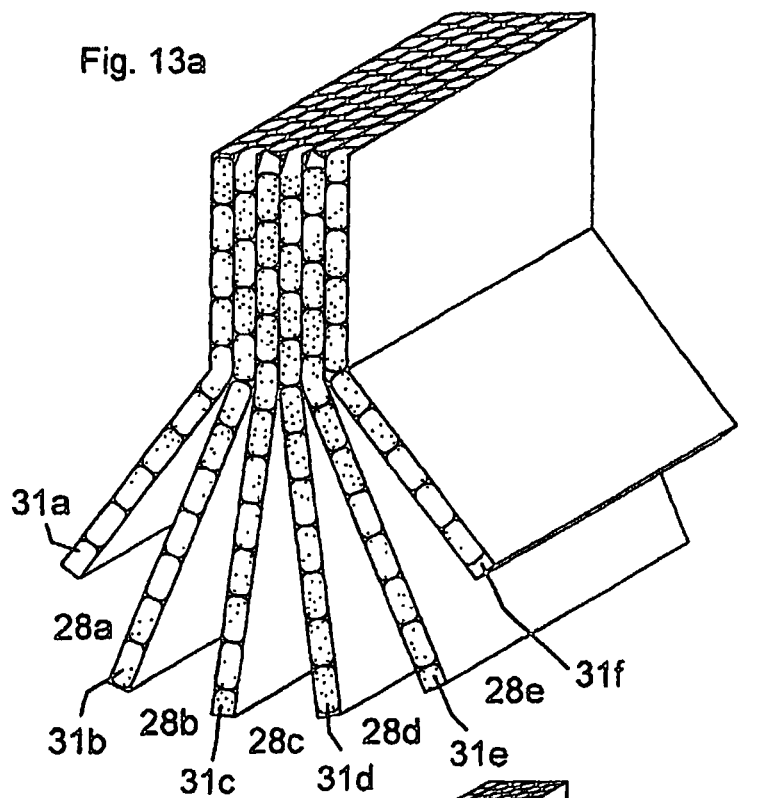
Figure 13B:
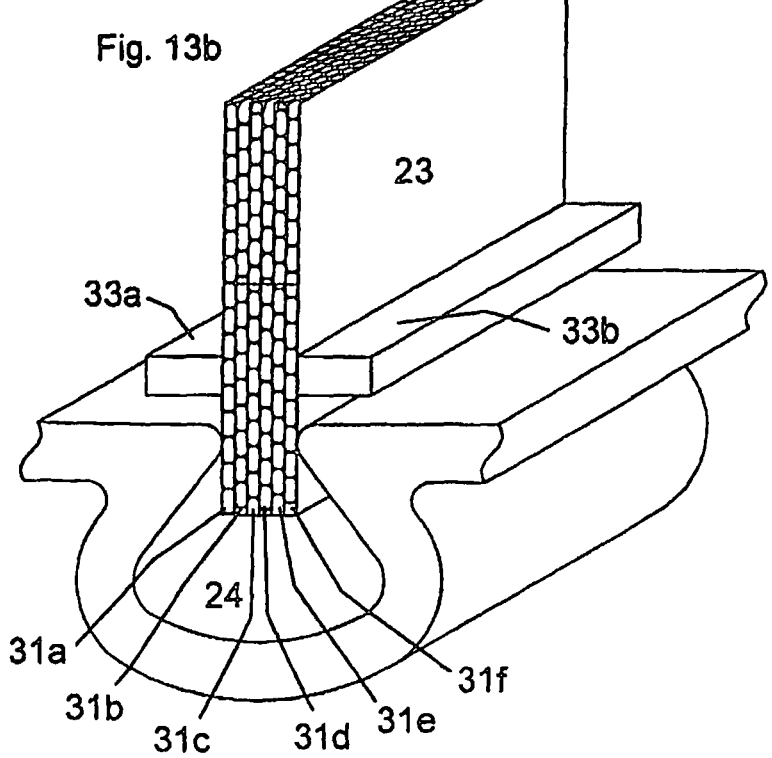

Referring to FIGS. 13a, 13b, 13c, and 13c, the construction of a dovetail joint is illustrated wherein fibers are continuous from within a cured component 23 into a dovetail receptacle 24 within structure 33. The portion of the reinforcing fibers which are to form the dovetail connection 31a, 31b, 31c, 31d, and 31e are infused with resin blocking substance prior to curing of component 23. Spaces 28a, 28b, 28c, 28d, and 28e may be blocked with elastomeric wedges, for example, during resin infusion and curing of component 23. After curing of component 23, the resin blocking substance is removed, leaving fabric portions 31a, 31b, 31c, 31d and 31e flexible and able to be inserted into dovetail receptacle 24 using guides 33a and 33b. FIG. 13c illustrates an example curing arrangement which provides for evacuation of receptacle 24 and subsequent resin infusion. Vacuum/resin injection line 30 is connected to cavity 24 which is sealed by gum tape 32.

Patents, publications, or other references mentioned in this application for patent are hereby incorporated by reference. In addition, as to each term used it should be understood that unless its utilization in this application is inconsistent with such interpretation, both traditional and common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the connection means as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the elements disclosed, xi) each potentially dependent claim or concept as a dependency on each and every one of the independent claims or concepts presented, and xxii) the various combinations and permutations of each of the above.

It should also be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. Further, if or when used, the use of the transitional phrase "comprising" is and will be used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

What is claimed is:

1. A method of providing exposed fibers at a surface of a fiber reinforced fabric comprising the steps of: infusing a solution of resin blocking substance into a portion of said fabric; using a thermal gradient that acts on said solution to control the extent of said infusion, said thermal gradient lowering a temperature of said infused solution at a desired resin blocking boundary at least to a gelation temperature of said solution; forming a gel of said solution at least at said desired resin blocking boundary; drying said gel, thereby increasing a melting point of said gel, to form a resin blocking barrier having said desired resin blocking boundary; establishing resin into at least a portion of said fabric that is not occupied by said resin blocking barrier; curing said resin without changing said resin blocking boundary, and dissolving said resin blocking barrier.

2. A method as described in claim 1 wherein said resin blocking substance comprises a PVA based compound.

3. A method as described in claim 1 wherein said resin blocking substance is water soluble.

4. A method as described in claim 1 wherein said solution of resin blocking substance has a melting point that is lower than a melting point of said resin blocking substance before its dissolution.

5. A method as described in claim 1 wherein said solution of resin blocking substance is infused into said fabric in a pattern.

6. A method comprising the steps of infusing a solution of resin blocking substance into a fiber reinforced material, wherein said solution becomes a gel upon reaching a gelation temperature; terminating said infusion through cooling of said solution under a thermal gradient to at least said gelation temperature, so that said solution infuses to a desired infusion depth; gelling said solution at least at said desired infusion depth to generate a gel; increasing a melting point of said gel to generate a resin blocking barrier having an increased melting point, and a resin blocking boundary at an infusion depth that is equal to said desired infusion depth; infusing resin into said fiber reinforced material in an area without said resin blocking barrier and against said resin blocking boundary; bringing said infused resin to a resin curing temperature, wherein said resin curing temperature is above said gelation temperature but below said increased melting point; curing said infused resin without changing said infusion depth; and dissolving said resin blocking barrier from said fiber reinforced material to expose fibers at a surface of said fiber reinforced material.

7. A method as described in claim 6, further comprising the step of bonding a second material to said surface.

8. A method as described in claim 6 wherein said solution is an aqueous solution.

9. A method as described in claim 6 wherein said fiber reinforced material is selected from the group consisting of fiber reinforced cloth, fiber reinforced fabric, fiber matrix, and fiber reinforced composite article.

10. A method as described in claim 6 wherein said step of gelling said solution at least at said desired infusion depth comprises the step of gelling all of said infused solution.

11. A method as described in claim 6 further comprising the step of decreasing a melting point of said resin blocking substance before performing said step of infusing a solution into said fiber reinforced material.

12. A method as described in claim 11 wherein said step of decreasing a melting point of said resin blocking substance comprises the step of dissolving said resin blocking substance in water to create an aqueous solution of said resin blocking substance.

13. A method as described in claim 6 wherein said step of increasing a melting point of said gel is performed after said step of gelling said solution at least at said desired infusion depth is performed but before said step of infusing resin is performed.

14. A method as described in claim 13 further comprising the step of dissolving said resin blocking substance in water to create said solution before performing said step of infusing said solution into said fiber reinforced material.

15. A method as described in claim 14 wherein said step of increasing a melting point of said gel comprises the step of drying said gel.

16. A method as described in claim 6 wherein said step of terminating said infusion through cooling of said solution under a thermal gradient comprises the step of terminating said infusion through cooling of said solution under a transient thermal gradient.

17. A method as described in claim 6 wherein said step of terminating said infusion through cooling of said solution under a thermal gradient comprises the step of terminating said infusion through cooling of said solution under a steady state thermal gradient.

18. A method as described in claim 6 wherein said step of dissolving said resin blocking barrier comprises the step of dissolving said resin blocking barrier with water.

19. A method of exposing fibers at a surface of a fiber reinforced material comprising the steps of infusing a resin blocking substance solution into a portion of said fiber reinforced material; terminating said infusion through cooling of said resin blocking substance solution under a thermal gradient so that said resin blocking substance solution infuses only to a desired infusion depth; drying said infused solution to form a resin blocking barrier of said resin blocking substance having a resin blocking boundary; infusing resin into said fiber reinforced material in an area of said fiber reinforced material without said infused resin blocking barrier; bringing said infused resin to a resin curing temperature without changing said resin blocking boundary; curing said infused resin; and removing said resin blocking barrier from said fiber reinforced material to expose said fibers at said surface of said fiber reinforced material.

20. A method as described in claim 19 further comprising the step of gelling said resin blocking solution at least at said infusion depth.

21. A method as described in claim 19 further comprising the step of establishing said thermal gradient before starting the step of infusing a resin blocking substance solution into a portion of said fiber reinforced material.

22. A method as described in claim 19 wherein said fiber reinforced material is material selected from group consisting of fiber reinforced cloth, fiber reinforced fabric, fiber matrix, and a fiber reinforced article.

23. A method as described in claim 19 wherein said step of removing said resin blocking barrier comprises the step of dissolving said resin blocking barrier.

24. A method as described in claim 23 wherein said step of dissolving said resin blocking barrier comprises the step of dissolving said resin blocking barrier with water.

25. A method of forming a resin blocking barrier within a fiber reinforced material comprising the steps of: establishing a resin blocking substance within said material; controlling, with a thermal gradient that acts on said resin blocking substance, a distance to which said resin blocking substance infuses into said fiber reinforced material, said distance being the distance from said surface at which, under said thermal gradient, at least a portion of said resin blocking substance cools and gels such that it is not infused further from said surface than said distance; forming a gel of said resin blocking substance within said fiber reinforced material; and drying said gel to form a resin blocking barrier that has a melting point that is higher than a cure temperature of resin to be infused into a portion of said fiber reinforced material without said resin blocking barrier.

26. A method as described in claim 25 further comprising the steps of infusing said resin, bringing said infused resin to said cure temperature, and curing said infused resin.

27. A method as described in claim 25 wherein said fiber reinforced material is material selected from group consisting of fiber reinforced cloth, fiber matrix, fiber reinforced article, fiber reinforced fabric.

28. A method as described in claim 25 further comprising the step of decreasing a melting point of said resin blocking substance before performing said step of establishing a resin blocking substance within said material.

29. A method as described in claim 28 wherein said step of decreasing a melting point of said resin blocking substance comprises the step of dissolving said resin blocking substance in water to create an aqueous solution of said resin blocking substance.

30. A method as described in claim 25 further comprising the step of dissolving said resin blocking substance to create a solution of said resin blocking substance before performing said step of establishing a resin blocking substance within said material.

31. A method as described in claim 30 wherein said step of dissolving said resin blocking substance to create a solution of resin blocking substance comprises the step of dissolving said resin blocking substance in water to create an aqueous solution of resin blocking substance.

32. A method of producing a fiber reinforced, resin infused material having exposed fibers at a surface thereof comprising the steps of: infusing a blocking agent into a fiber reinforced material through said surface, wherein said blocking agent is a solution having a depressed melting point temperature; cooling said blocking agent to at or below said depressed melting point temperature; gelling at least a portion of said blocking agent that is below said surface to generate a blocking agent that is gelled; drying said blocking agent to generate a blocking agent that is dried, thereby increasing a melting point temperature thereof; infusing resin into a portion of said fiber reinforced material without said blocking agent; and dissolving said blocking agent so as to remove it from said fiber reinforced material and expose said fibers at said surface.

33. A method of producing a fiber reinforced, resin infused material having exposed fibers at a surface thereof as described in claim 32 wherein said step of dissolving said dried blocking agent comprises the step of dissolving said blocking agent with water.

34. A method of producing a fiber reinforced, resin infused material having exposed fibers at a surface thereof as described in claim 32 wherein said step of infusing a blocking agent into a fiber reinforced material through said surface comprises the step of contacting fiber reinforced material rolled on a drum with said blocking agent.

35. A method of producing a fiber reinforced, resin infused material having exposed fibers at a surface thereof as described in claim 32 wherein said step of cooling said blocking agent comprises the step of cooling said fiber reinforced material with a cold drum and contacting said cooled material with said blocking agent.

36. A method of producing a fiber reinforced, resin infused material having exposed fibers at a surface thereof as described in claim 32 wherein said blocking agent comprises a resin blocking substance.

37. A method of producing a fiber reinforced, resin infused material having exposed fibers at a surface thereof as described in claim 36 wherein said resin blocking substance comprises a PVA based compound.

38. A method of producing a fiber reinforced, resin infused material having exposed fibers at a surface thereof as described in claim 32 wherein said step of cooling is performed under an imposed temperature gradient that controls the depth to which said blocking agent infuses into said fiber reinforced material.

39. A method of producing a fiber reinforced, resin infused material having exposed fibers at a surface thereof as described in claim 38 wherein said imposed temperature gradient is caused, at least in part, by the temperature of a cold drum with which said fiber reinforced material is initially in contact.

* * * * *